(12) United States Patent
Willen et al.

(10) Patent No.: US 6,996,822 B1
(45) Date of Patent: Feb. 7, 2006

(54) HIERARCHICAL AFFINITY DISPATCHER FOR TASK MANAGEMENT IN A MULTIPROCESSOR COMPUTER SYSTEM

(75) Inventors: James W. Willen, Shoreview, MN (US); James F. Merten, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 920 days.

(21) Appl. No.: 09/920,023

(22) Filed: Aug. 1, 2001

(51) Int. Cl.
*G06F 9/46* (2006.01)

(52) U.S. Cl. ............ 718/102; 718/100; 718/101; 718/103; 711/100

(58) Field of Classification Search ........ 718/100–103; 712/220, 229; 711/100
See application file for complete search history.

(56) References Cited

U.S. PATENT DOCUMENTS 5,212,777 A * 5/1993 Gove et al. ............ 712/229
6,088,771 A * 7/2000 Steely et al. ............ 711/154

* cited by examiner

Primary Examiner—Meng-Al T. An
Assistant Examiner—Nilesh Shah
(74) Attorney, Agent, or Firm—Charles A. Johnson; Beth McMahon; Mark T. Starr (57) ABSTRACT

An Operating System (OS) function maps affinity to processors for each new task and except for certain circumstances where other processors are permitted to steal tasks, this affinity remains unchanged. Hierarchical load balancing is mapped through an affinity matrix (that can be expressed as a table) which is accessed by executable code available through a dispatcher to the multiplicity of instruction processors (IPs) in a multiprocessor computer system. Since the computer system has multiple layers of cache memories, connected by busses, and crossbars to the main memory, the hierarchy mapping matches the cache memories to assign tasks first to IPs most likely to share the same cache memory residue from related tasks, or at least less likely to incur a large access time cost. Each IP has its own switching queue (SQ) for primary task assignments through which the OS makes the initial affinity assignment. When an IP's SQ becomes task free, the dispatcher code has the free IP look to the SQ of other IPs in accord with the mapped hierarchy, if a threshold of idleness is reached.

26 Claims, 6 Drawing Sheets

Fig. 5 (IP IDLE FLAG DATA)

HIERARCHICAL AFFINITY DISPATCHER FOR TASK MANAGEMENT IN A MULTIPROCESSOR COMPUTER SYSTEM

BACKGROUND OF THE INVENTION

1. Field of the Invention

This invention relates generally to the field of managing tasks that an instruction processor is assigned to do within a computer system having multiple instruction processors.

2. Background Information

In the field of multiprocessor computer systems, it can be difficult to strike the right balance between and among the processors so that the computing tasks are accomplished in an efficient manner with a minimum of overhead for accomplishing the assigning of tasks.

The preferred design should not allow a majority of the available tasks to be assigned to a single processor (nor to any other small subset of all processors). If this occurs, the small subset of processors is kept too busy to accomplish all its tasks efficiently while others are waiting relatively idle with few or no tasks to do and the system is not operating efficiently. It should therefore have a load leveling or work distribution scheme to be efficient.

Also, to take advantage of cache memory (which provides for quicker access to data because of cache's proximity to individual processors) an assignment of tasks based on affinity with a processor or processor group that has the most likely needed data already in local cache memory(ies) to bring about efficiencies should also be designed-in. As is understood in this art, where a processor has acted on part of a problem (loading a program, running a transaction, or the like), it is likely to reuse the same data or instructions in its local cache, because these will be found there once the problem is begun. By affinity we mean that a task, having executed on a processor, will tend to execute next on that same processor or a processor within that processor's group. (Tasks begun may not complete due to a hardware interrupt or for various other reasons not relevant to our discussion). Where more than one processor shares a cache, the design for affinity assignment could be complicated, and complexity can be costly, so the preferred design should be simple.

These two goals, affinity and load leveling, seem to be in conflict. Permanently retaining task affinity could lead to overloading some processors or groups of processors. Redistributing tasks to processors to which they have no affinity will yield few cache hits and slow down the processing overall.

These problems only get worse as the size of the multiprocessor computer systems gets larger.

Typically, computer systems use switching queues and associated algorithms for controlling them to assign tasks to processors. Typically, these algorithms are considered an Operating System (OS) function. When a processor "wants" (is ready for) a new task, it will execute the (usually) re-entrant code that embodies the algorithm that examines the switching queue. It will determine the next task to do on the switching queue and do it. However, while it is determining which task to do, other processors that share the switching queue may be waiting on the switching queue, which the first processor will have locked in order to do the needed determination.

A known solution to the leveling vs. affinity problem is to have a switching queue (SQ) per group and to add an extra switching queue to the switching queues already available. This meant that each group would exhaust tasks in its own queue before all seeking tasks from the extra SQ. Thus the bottle-neck or choke-point was simply moved to a less used SQ where conflicts would only develop when more than one task handler needed a new task at the same time as another task handler was seeking one. Of course, as the number of task handlers increases, the lock conflicts for obtaining such an additional queue become a choke-point in the system operations. Also, when the overflow or extra SQ bore no relation to the handler's affinity, the value of cache memory was denigrated (cache hits would decline) because no affinity advantage would accrue to such a system.

Accordingly, there is a great need for efficient dispatcher programs and algorithmic solutions for this activity.

SUMMARY OF THE INVENTION

A multiprocessor computer system architecture has complexity involved in assigning tasks to take maximum advantage of the processing capability of the system. We describe three features for handling dispatching or assigning tasks to instruction processors (IPs) within a multiprocessor computer system. Assignment of affinity to a single IP (or in one embodiment, a single cluster of IPs) is accomplished using a switching queue for each IP (or cluster) and is accomplished by an operating system (OS) component. (It should be noted that a cluster could be a single IP or any sized group of IPs within a partition, and that there may be clusters of uneven sizes and types if desired. Such modifications to the basic idea are considered within the scope of this invention). To alleviate overburdening which could result in unbalanced processing task assignment to single processors (or to single clusters), an assignment of other IPs switching queues from which tasks can be stolen is made for each IP (or cluster) in a hierarchical manner, designed to accommodate affinity and access times across the multiprocessor's architecture. Finally, a monitor is described which examines a level of busyness, first for each processor and then for the system, before producing a value that acts as a threshold for whether a stealing operation can proceed. Pre-assignments or other methods for assigning affinity are also discussed.

These three main features can be used independently for some benefit or all together for maximum benefit. They can be applied to various computer system architectures and the inventive features, especially the monitor and the stealing system, can be modified to achieve maximum benefit in accord with the principles described herein.

The preferred computer system providing the context for the operation of the present invention is a multiple instruction processor computer system having at least three levels of memory, the at least three levels being at least two cache levels, a first of which is accessible directly by a single one of the instruction processors, a mid-level memory being a multiprocessor-accessible cache accessible by at least two of said instruction processors, and a third memory level being a main memory, accessible by all of said instruction processors. (Also, a lower first level cache provides store through functionality into the mid-level cache, but this is not relevant to the use of the invention). Data pathways describe a hierarchy of memory with such architecture. The ability of a processor to steal from task queues of other processors is intentionally hindered to a degree manipulated by reference to predetermined parameters designed with this memory hierarchy in mind.

DETAILED DESCRIPTION OF THE PREFERRED EMBODIMENTS

Figure 1:
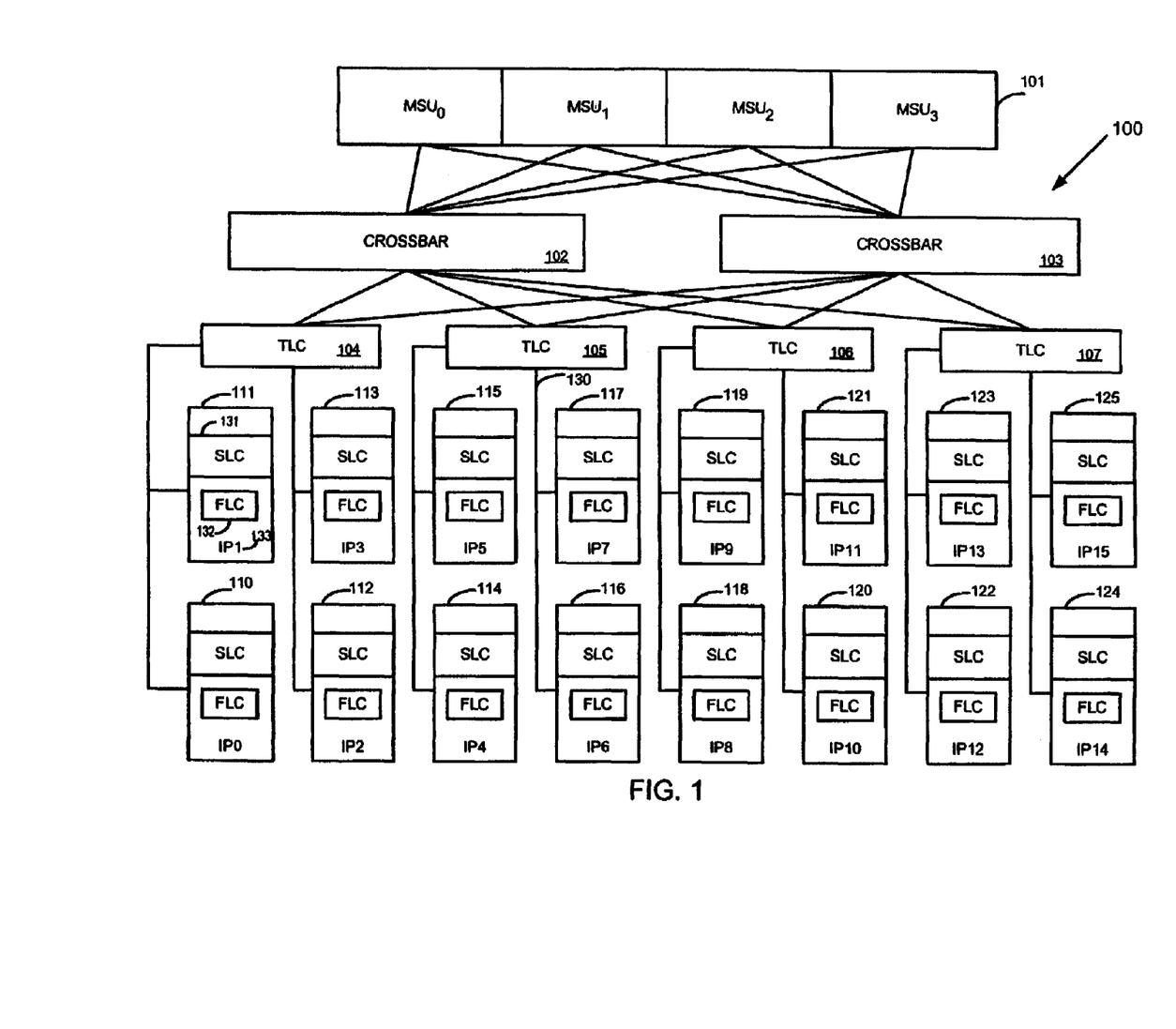
FIG. 1 is a block diagram of a multiprocessor computer system with which the invention can be used.

A multiprocessor computer system 100 which could take advantage of this invention is described in one form with reference to FIG. 1. Larger versions, which employ the invention, can be built in a modular manner using more groups of components similar to the ones shown but for purposes of this discussion a 16-processor version suffices. There is a central main memory 101 having a plurality of memory storage units $MSU_{0-3}$. These can be configured to form a long contiguous area of memory or organized into many different arrangements as is understood in this industry. The MSUs are each connected to each of the two crossbars 102, 103, which in turn are connected to the highest level of cache in this exemplary system the Third Level Caches (TLCs) 104–107. These TLCs are shared cache areas for all the IPs underneath them. Data, instruction and other signals may traverse these connections similarly to a bus, but advantageously by direct connection through the crossbars in a well-known manner. The processors IP0–15 are instruction processors of the "2200" variety in a "CMP" computer system from Unisys Corporation in the preferred embodiment but could be any processors. A store-through cache is closest to each instruction processor (IP), and since it is the first level cache above the instruction processor is called an FLC for First Level Cache. The second level caches and third level caches are store-in caches in the preferred embodiment computer systems. The second level caches (SLCs) are next above the FLCs and accessed by only one IP.

Note that each block 110–125 containing a FLC, SLC and IP are connected via a bus to their TLC in pairs and that two such pairs are connected to each TLC. Thus the proximity of the SLCs of IP0 and IP1 is closer than the proximity of IP2 and IP3 to the SLCs of IP0 and IP1. (The busses are illustrated as single connecting lines; example: TLC 105 connected by bus 130 to blocks 117 and 116). Also, the proximity of IP0–3 to TLC 104 is greater than the proximity of any of the other IP's to TLC 104. By this proximity, a likelihood of cache hits for processes or tasks being handled by most proximate IPs is enhanced. Thus, if IP1 has been doing a task, the data drawn into SLC 131 and TLC 104 from main memory (the MSUs) is more likely to contain information needed for that task than are any of the less proximate caches in the system 100.

It should be noted that this system 100 describes a 16 IP system, and that with two additional crossbars, the system could be expanded in a modular fashion to a 32 IP system, and that such systems can be seen for example in the Unisys Corporation ES7000 computer system. It should also be recognized that neither number of processors, nor size, nor system organization is a limitation upon the teachings of this disclosure. For example, any multiprocessor computer system, whether NUMA architected or UMA as in the detailed example described with respect to FIG. 1 could employ the teachings herein to improve performance and avoid the bottle-necks or choke-points mentioned in the background section above.

Figure 2:
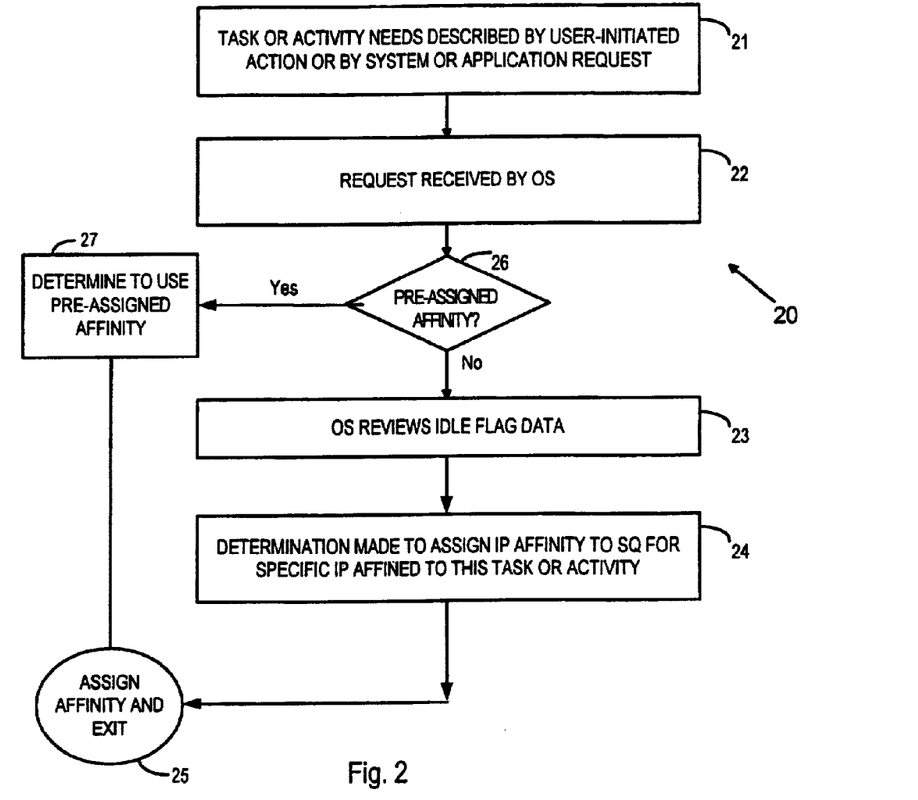
FIG. 2 is a flow diagram of a process in accord with the invention herein of distributing tasks in accord with likely most efficacious affinity.

Turning now to FIG. 2, in which a flow chart 20 outlines the major steps 21–27 involved in assigning an affinity to a processor for a task, the first action taken can come from various sources (mentioned in step 21). A common initiator for generating the need for activities or tasks to occur is a user. For example, if a user wants to start up an application program, all of the environmental requirements for that program must be set up; the parameters defined, the buffers allocated, and the like, as may be needed by that program. Each of these activities must be accomplished by an instruction processor. Thus, in step 21, whatever needs for activities that are described by a user-initiated action are called for by that action. Other things like the operating system doing housekeeping tasks, already running applications requiring new resources or activities to be allocated or undertaken, and the like can also generate a group of new activities or tasks which must be done by a processor as is generally understood in the art.

These task requests, however initiated, are received by a program that exists either within or below the level of the operating system. In the Unisys Corporation 2200 computer systems, a program called the Exec receives 22 these task requests, sometimes in the form of calls from the operating system itself and sometimes from user programs. For purposes of simplicity in explanation since various systems will have different operating system implementations, we shall refer to the program that handles the task requests just as the Operating System or OS. Thus, the "OS" receives 22 these task requests.

Figure 5:
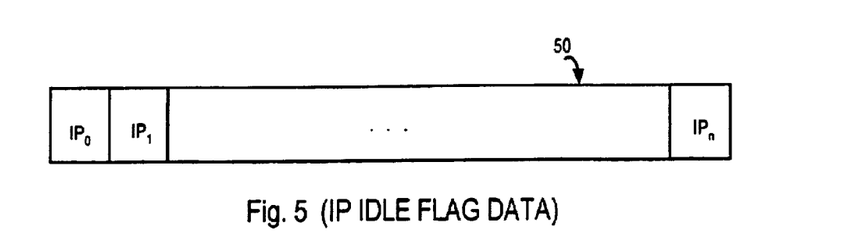
FIG. 5 is a block diagram of a memory area containing idle flags or other idle information related to each of the instruction processors in a computer system, which can be used with the invention herein.

Whichever OS program handles the requests for tasks, in the preferred embodiment of this invention that program will review the data in an area of memory that keeps idle status information about each of the IPs within the system. A memory location 50 is pictured in FIG. 5 with single bit idle flags for each instruction processor $IP_{0-n}$. These areas can be larger if additional information is desired to be kept or if a greater level of specificity is desired to characterize idleness.

The operating system sets six bits in the header of each task (or task address or task identifier if tasks are handled by a reference), in the preferred embodiment to identify the specific processor or SQ to which that task is affined. That task then always belongs to the affined processor, unless it is stolen, during which the six bits identifying a particular SQ or IP are changed by the stealing processor and incorporated into the task header. In one preferred embodiment a user will be able to set the six bits (or their equivalent) and lock them so that no other process or user can change the affinity for that particular task.

Some computer systems which employ this invention could have multiple instances of operating systems, each controlling a partition. In such cases, the invention should be preferably duplicated for each partition. In the most preferred embodiment a OS program reviews all idle status information 23 from all of the instruction processors in its system (or part thereof if there are multiple OS partitions), and assigns an IP affinity 24 to each new task based on a first encountered idle processor, augmented by a round-robin progression algorithm. Thus, the first time the OS encounters a task which has not been assigned to a processor, the OS assigns an affinity to an instruction processor, or more precisely, to that IP's switching queue, preferably based on reference to an idle-processor-cache line such as is depicted for the preferred embodiment in FIG. 5.

There are several ways this assignment step can be performed. More complexity can be added to the assignment algorithm if desired, especially if time-being-idle information is included in the idle processor information area. For example, the algorithm could weight the time a processor has been idle instead of the simple rotation of assignments through the IP numbers that a round-robin scheme provides. Such variations that employ the other ideas of this invention are considered within the scope of this disclosure if they are within the ordinary skill of one practicing in these arts.

In one preferred embodiment (handled in steps 26, 27) the investigation of idleness is omitted and is replaced by reliance on a pre-assigning affinity. This special case occurs when a user task submits a request to the OS, which creates a new task to service the request. The new OS task is pre-assigned the same affinity as the user task under the assumption that the new OS task will be accessing user task data, which more likely still resides in the closest cache. Thus, step 26 determines if there is a pre-assignment and step 27 determines that that assignment will control. Since typically, the same IP that is running such a user task requesting the dispatcher code of the OS will also be running the OS dispatcher code (on an interrupt from the user task) the affinity assigned 28 will be to the same IP in these special cases.

Once the method for determining affinity assignments is completed 27 or 24, affinity is assigned 25 and this part of the dispatcher program is completed.

Figure 3:
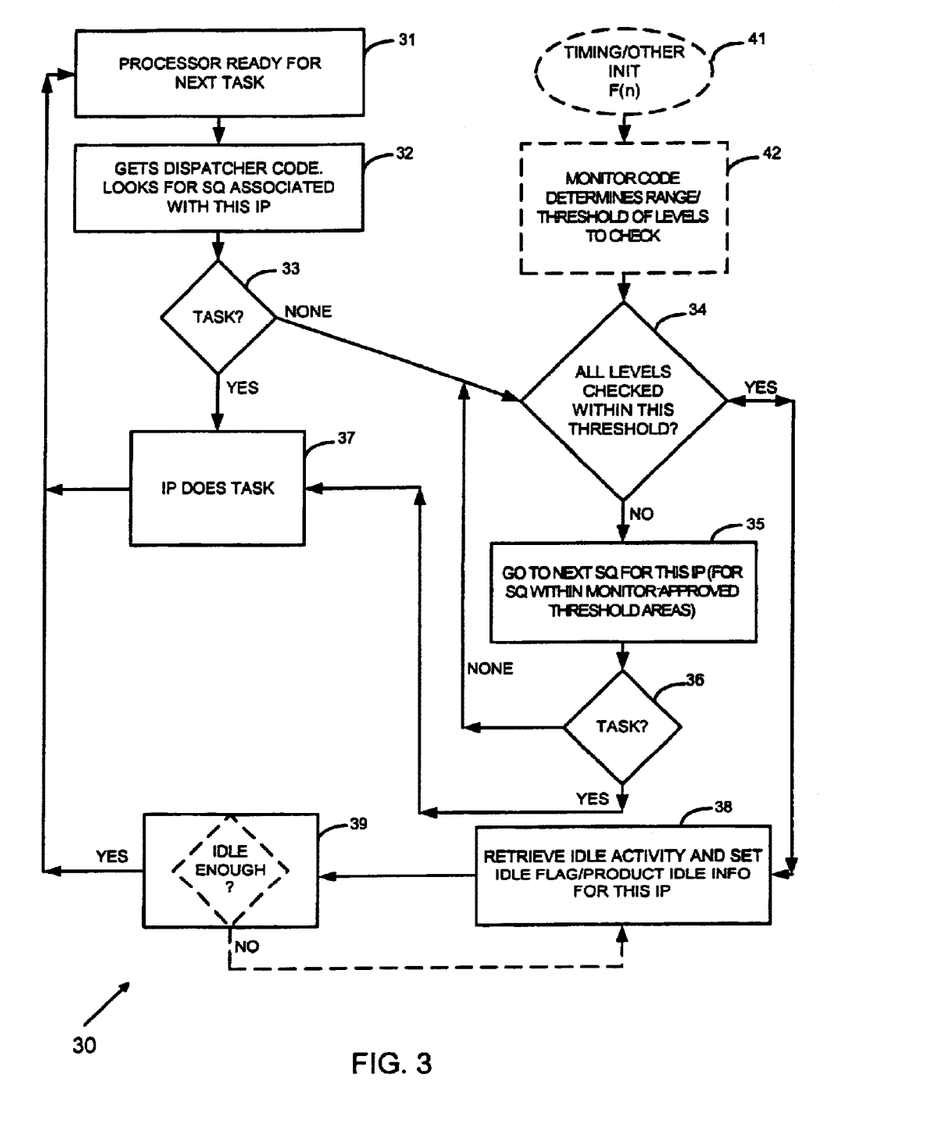
FIG. 3 is a flow diagram of a process in accord with the invention herein of using a dispatcher algorithm to assign tasks to a particular instruction processor.

FIG. 3 provides a flow chart 30 for describing the process of determining which task a processor will do next in accord with a preferred embodiment of the invention. The processor or IP must first be ready for a task 31, whereupon it goes 32 to the dispatcher area (in the OS) to get and execute dispatcher code, and obtains the data that is needed from the switching queue (SQ). (The data in the SQ indicates which task may be done next). The algorithm to select a task from the SQ is not the subject of this invention; any algorithmic solution is acceptable for this purpose. In the preferred embodiment, a unique switching queue exists for and is associated with each IP. Each switching queue has space allocated when the operating system is first set up.

In the preferred embodiment a timer continually triggers the running of a monitor program but other kinds of triggers can initiate it as well (step 41). For example, each time a processor looks for a new task, all processors can get a closely-timed interrupt to report their busyness to the memory area described with reference to FIG. 5. Busyness can typically be measured as time not running idle over a last period since the busyness was checked or other measures can be used. The range for a period to measure should probably be between a few tenths of a second and a few seconds, although it could be based on number of elapsed instruction cycles or some other measure. When triggered, the monitor code should match the values measured against predetermined levels of idleness which operate as thresholds 42 (see also FIG. 7, the L's) to determine whether a particular IP can be allowed to steal a task from a particular SQ, preferably selected in an order in accord with a hierarchically structured chart like that of FIG. 4. This determination will be made in step 34.

If 33 there is a task in the associated SQ, the IP will execute it 37, and return to the ready for a new task state 31. If there is no task in the associated queue, the IP will check the next affinity level SQs for tasks 35, 36. As mentioned just above, the range of affinity levels to be checked is determined periodically by a monitor in step 41. (This is also described in greater detail with reference to FIG. 6. Basically, an SQ can be checked for tasks if the threshold for the level of the SQ that the processor wants to next check (as in steps 35, 36) is met by the idleness characteristics the monitor is checking for). If the IP has already been through this part of the program before and has already checked each available affinity level of SQs but found no tasks needing processing 34 (Yes), then the idleness activities 38 are begun. If all the SQs permitted by the monitor (for this IP) are already checked and found to be without tasks to do, the processor should go into an idle state as described in step 38. In the preferred embodiment computer systems this state is achieved by giving the IP an idle task. Preferably at the same time, the idle information about this processor can be reset or otherwise updated. In the preferred embodiment this is simply a flag, indicating that the processor is in an idle state. However, one can store time stamp information to determine the last time this processor went into the idle state, process the data to determine how long the processor has been idled over a given period, and the like. In nearly all cases a time-out or end of idle time process 39 should stop the running of the idle task or take the processor out of the idle state. Here illustrated is a both a positive activity and a question at 39, showing that there are alternative ways to handle this. A determination that the idling has been sufficient and that one wants this processor to go back to searching for new tasks can, if one wants, depend upon the idle states of the other processors, the time of day, or even payments a renter of the computer system may be paying, as may be advantageous to the designer or owner of the computer system. Alternatively, an interrupt at step 39 can cause an idle state to abort. When there has been sufficient idling the processor goes back to the ready state 31.

Figure 4:
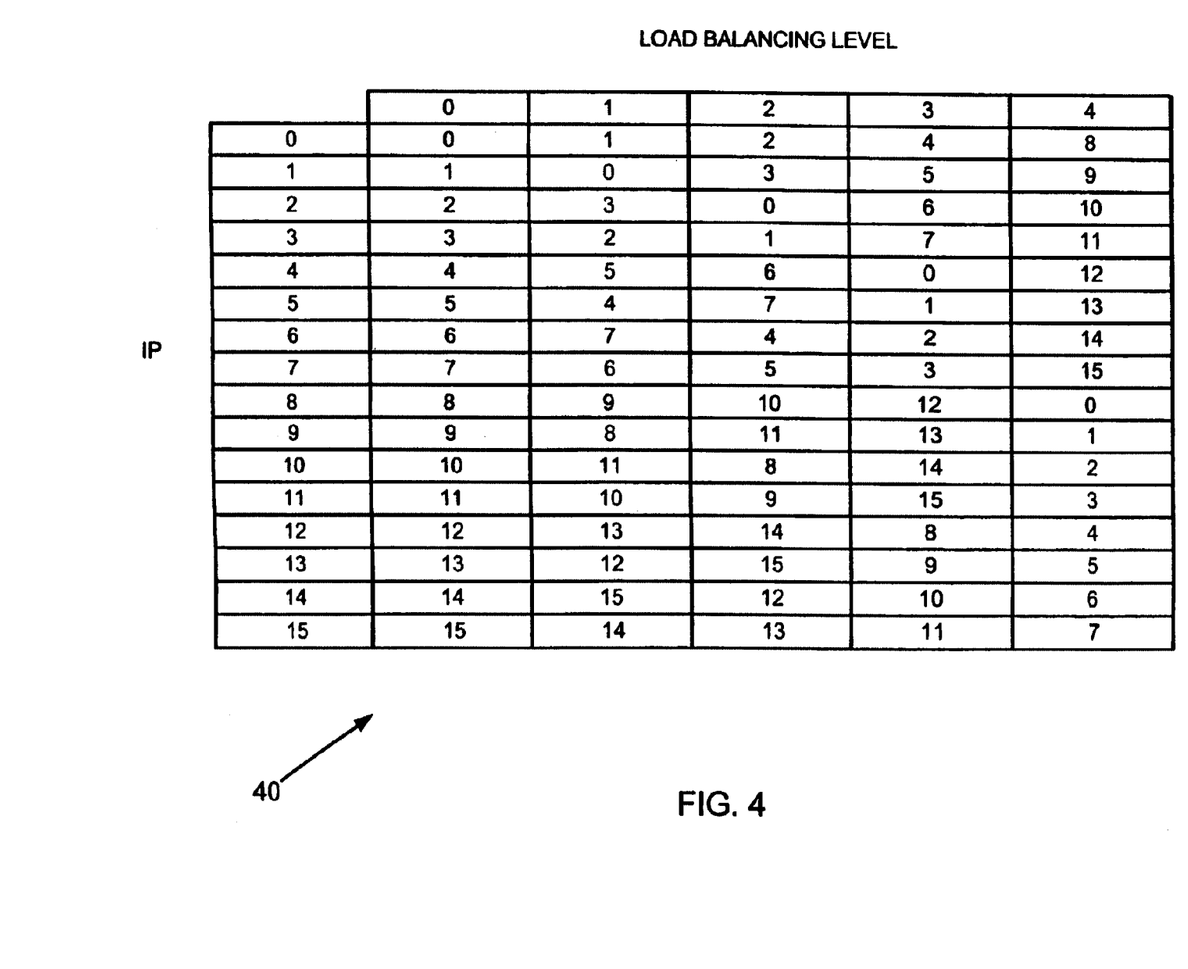
FIG. 4 is a chart of a preferred distribution of switching queue overflows to accommodate anticipated idle processors in accord with the invention.

Load balancing in accord with the preferred embodiments can best be described with reference to FIGS. 4 and 1. The table 40 in FIG. 4 contains four load-balancing levels across the top and sixteen IP numbers for each of the sixteen IPs in the system of FIG. 1. It should be understood that the table can be expanded for more than 16 processors or more than 4 load balancing levels.

The thing most apparent from the chart is that each processor has as its first load balancing level a referral to its own switching queue. Thus, IP0 looks to switching queue (SQ) 0, IP1 to SQ1 and so forth. Upon going through the flow chart steps outlined with reference to FIG. 3 above, the processors will move to their next load balancing level within their closest affinity relationship first, when they have no tasks within their own switching queues. Thus, when IP6 finds no tasks in its SQ6, it will draw from the SQ7. Note from the hardware overview in FIG. 1 that IP7 and IP6 are on the same bus 130, and share the same Third Level Cache (TLC 105). If IP6 finds no tasks within SQ7, its next SQ to call upon is at load balancing level 2 from chart 40, i.e., SQ4. SQ4 and SQ5 are the same level of distance from IP6 so it does not matter which one we use, just that one of these has to be for IP6 at level 2 and the other one, SQ5, should be provided as the level 2 load balancing SQ for IP7 in order to retain the highest likelihood of affinity to IP6's overall set of tasks and thus most efficacious use of cache memory.

Level 3 for IP6 sends it to SQ2 in chart 40 for new tasks. At this level, any of the SQs that are primary SQs for IPs using TLC 104 would be satisfactory for affinity purposes. At the next level, the SQ used as the primary SQ for IP14 is chosen in accord with chart 40. Here we have jumped from one crossbar to a second one (102–103). At this level any one of the SQs that are primary SQs for IPs 8–15 would provide equivalent affinity benefits. If there were an additional crossbar with an additional pair of TLCs and an additional eight IPs, the primary SQs of any of those eight additional IPs would provide equivalent affinity. The same would be true of yet another set of crossbars, TLCs and IPs. Thus, the general idea is to direct attention of an IP looking for tasks to the SQ of the IP with the closest affinity first, then outward to SQs of IPs with less affinity, before putting an IP into an idle state.

Thus to take a small example, if IP0 is very busy and IP1 is not, IP1 (after referring to its own SQ1) will look first to IP0's SQ0 for work. If they are both very busy and have more work than they can do at a given moment and IP2 is about to go idle and is looking for tasks, IP2 will only look to SQ0 at the third level (level 2 on chart 40), after having first checked its own SQ2, then checking SQ3, before checking for tasks on SQ0. Thus the SQ0 of the overworked IP0 will be worked by three processors, balancing and equalizing the amount of work among the three processors at the third level. The fourth level looks to a switching queue from one of the processors under a different TLC, here SQ6, the primary SQ for IP6. The fifth level (labeled 4 on the chart of FIG. 4) goes even further afield to an SQ acting as the primary SQ for a processor on the other crossbar, SQ10.

Figure 7:
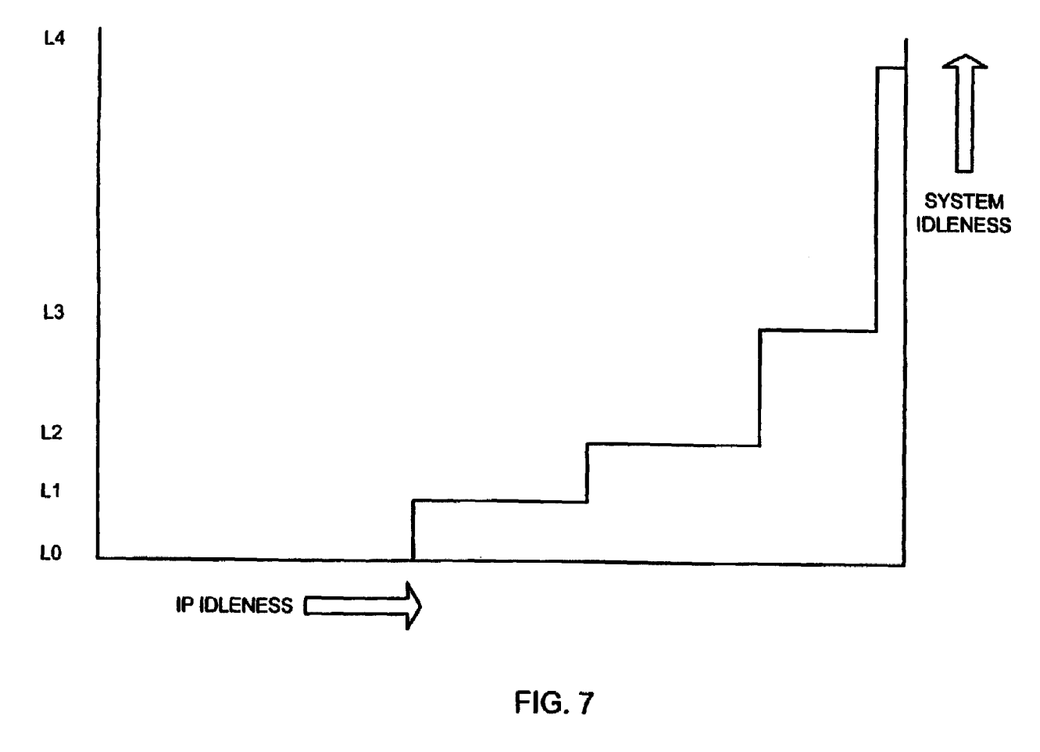
FIG. 7 is a chart showing idleness levels of the system and the IP versus preferred embodiment levels for thresholds.

The chart of FIG. 7 is provided to show the approximate considerations in setting the preset levels of thresholds relative to IP idleness and system idleness in accord with the preferred embodiment on the referenced multiprocessor computer system. Note that the large gap between the thresholds at L2 and level L3, and between L3 and L4, indicating that the ability to steal from across TCLs or higher levels is greatly to be discouraged.

This provides efficient load balancing generally, however, because of the design of the multiprocessor architecture there are inefficiencies built in to strict adherence to such a scheme. Accordingly, by limiting the availability of SQs used primarily by other processors to some preferably adjustable parameter, the time cost of stealing tasks, and the concomitant change in affinity to a new processor (the stealing IP), can be accounted for. When a close SQ is going to be a target for stealing tasks by an idle processor, the parameter should be easily met, relative to the parameter value which should be considered when the stealing is going to be from a more distant IP.

The OS should therefore have a monitor to implement this set of tasks, and the monitor should preferably have two value determination parts. Each IP that has an empty queue should be asked to run a short program updating the time it has been idle. This is the monitor's first part, preferably run as part of the dispatcher program which is a part of the OS. The second part of the monitor, which could also be part of the dispatcher, evaluates the overall busyness of the processors running on this operating system. The monitor parameter should be constructed from the relative sizes of these two values determined by the two parts of the monitor program, although one could use either value alone with some efficacy.

Thus, using the monitor, if the processor is determined to be very idle and the rest of the system is determined to be very busy, it may be worth the time cost to steal a task from a SQ across the crossbar, although the parameter value that makes this possible should be very difficult to reach. Less busy system and more busy IP values suggest that it is less appropriate to steal, so perhaps stealing from the IP's SQ which is on the same bus under the TLC, or on the next bus under the same TLC or on the next TLC within the crossbar may be appropriate, depending on the value of the monitor determined parameter. Appropriate levels of parameter values for determining that stealing is useful will vary from system architecture to system architecture, of course, and probably ought to be experimentally derived for each system. These values should be preset and stealing enabled instead of an idle routine only when the values are reached.

A relatively easy way to implement this is to have the product of each IP's self-monitoring part of the monitor stored in an area accessible by all the other IPs. Then when the other IPs can use this data to calculate the system busyness level as well as other parameters which might interest the use.

With this redundancy in SQ availability, tasks get leveled and shared, first among the processors with most affinity and then among those with lesser and lesser affinity, and to get to those SQs of processors with less affinity, the difference between the busyness of the processor and the busyness of the system should be greater as the level of affinity is less.

As suggested above, these inventive ideas can be used in alternative computer system designs if desired. In the preferred embodiment system, the bus within a TLC group is the second level of affinity after unity, the third level is on the next bus within the TLC, the fourth level is under adjacent TLCs within a crossbar, and the fifth level is across crossbars. The load-balancing directory, which corresponds to chart 40, should optimally be within the dispatcher algorithm code to direct the IPs to the next level when their primary SQ is empty.

Figure 6:
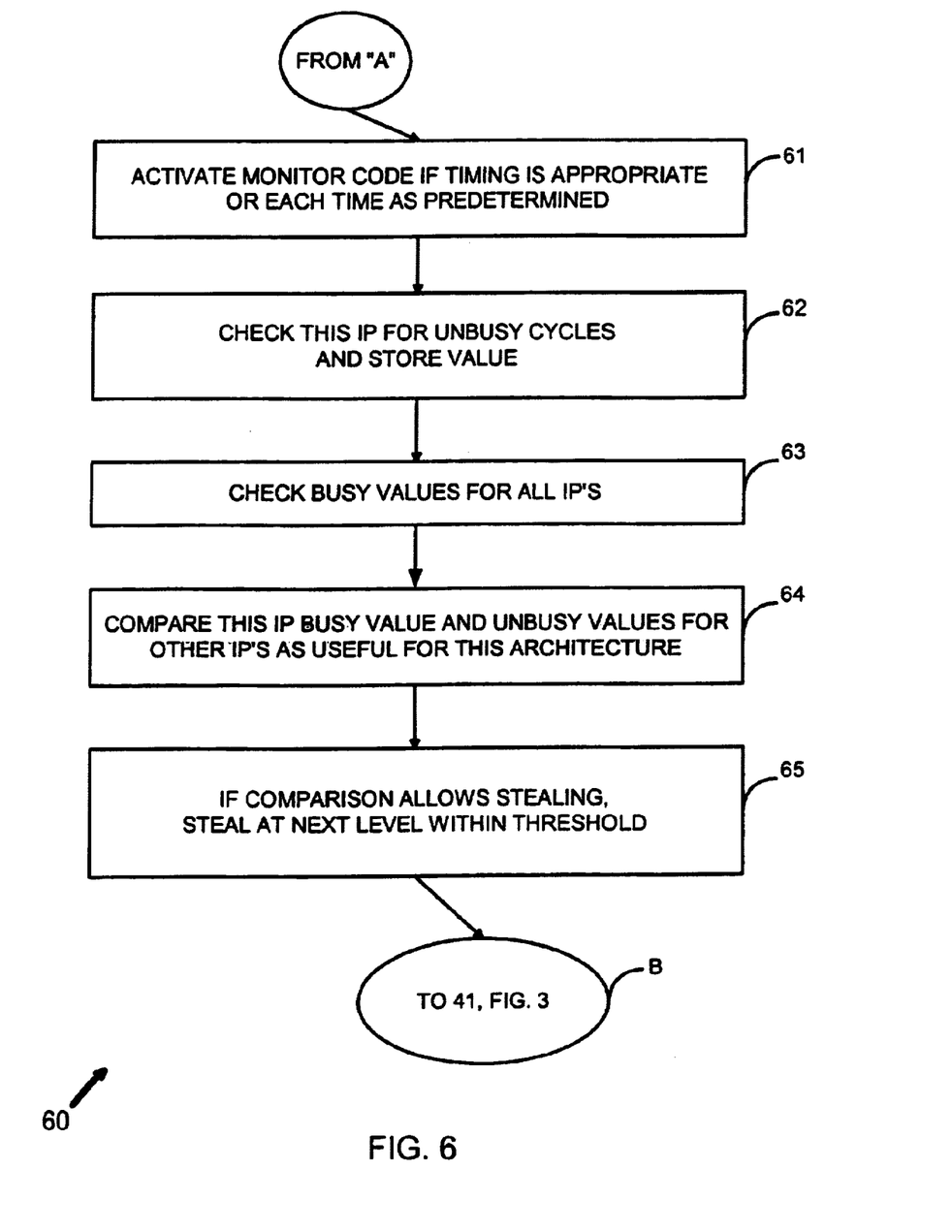
FIG. 6 is a block diagram of elements and actions summarizing a preferred form of the invention.

The monitor code function is illustrated in FIG. 6, as a flow chart 60, starting at point A and ending at point B, which connect it within the flow chart of the diagram of FIG. 3. Step 61 indicates that the monitor code is activated if appropriate timing is present. This means that in the preferred embodiment, after a timer times out or a set number of processing cycles is counted, the predetermined condition is met and the IP runs the monitor program.

In step 62 the IP checks its amount of time in which it has been idle since the last time it ran the monitor, and may add that to the idleness value from the previous run of the monitor or otherwise calculate a value indicative of present and/or past idleness. This new value is stored.

All the other IPs have stored values of idleness also, so to compare its own idleness value to that of the other IPs is a simple process of obtaining that data from known locations 63. Then these values are compared and a new value of comparative idleness (or its obverse, comparative busyness) and this new value is compared to preset thresholds for each level of load balancing through stealing which is available 64. Clearly, as mentioned before, this value will have to be substantially higher for cross-crossbar stealing, less high for cross third level cache (TLC) stealing, lower still for stealing within a TLC area but across a different bus and lowest to steal from a close IP's switching queue where that IP is on the same TLC bus.

If the threshold level is met for the level of stealing that is being contemplated, the IP will assign itself affinity to the first task available on that other IP's SQ 65 (assuming there is a task there to steal, else the process proceeds to contemplate the next level). If there are no tasks to steal within the SQs that can be accessed because the threshold is met, the IP should go into an idle task until the monitor runs again.

In other words, unless there are tasks within accessible SQs for an IP, the IP will go into idle mode, as described with respect to FIG. 3.

CONCLUSION

Described herein are three features for handling dispatching or assigning tasks to instruction processors (IPs) within a multiprocessor computer system. Assignment of affinity to a single IP (or in one embodiment, a single cluster of IPs) is accomplished using a switching queue for each IP (or cluster) and is accomplished by an operating system (OS) component. To alleviate overburdening which could result in unbalanced processing task assignment to single processors (or to single clusters), an assignment of other IPs' switching queues which can be stolen from is made for each IP (or cluster) in a hierarchical manner, designed to accommodate affinity and access times across the multiprocessor's architecture. Finally, a monitor is described which examines a level of busyness, first for each processor and then for the system, before producing a value that acts as a threshold for whether a stealing operation can proceed.

What is claimed is:

1. A method for assigning to and ordered executing of tasks by instruction processors in a multiple instruction processor computer system having at least three levels of memory, said at least three levels being at least two cache levels, a first of which is accessible directly by a single one of said instruction processors, a mid-level memory being a multiprocessor-accessible cache accessible by at least two of said instruction processors, and a third memory level being a main memory, accessible by all of said instruction processors, said method comprising:

selecting a processor-associated switching queue to which to assign a now task, assigning said new task to said selected switching queue by placing information about said selected switching queue into said new task, running a one of said instruction processors based upon tasks having information in said one instruction processor's associated switching queue until there are no tasks in said one instruction processor's associated switching queue and then, determining through the use of a selection matrix which other switching queue may be used as a second level switching queue by said one instruction processor, and inquiring by said one instruction processor of said second level switching queue for a next task that may be available on said second level switching queue.

2. The method of claim 1 wherein if said second switching queue has a said next task, assigning affinity for that task to said one instruction processor and allowing said one instruction processor to execute said next task.

3. The method of claim 1 wherein said selection matrix provides a hierarchical selection agenda through which access to a new switching queue is determined when said one instruction processor's associated switching queue has no tasks and wherein said hierarchical selection agenda first selects said second level switching queue from among switching queues associated with instruction processors on a same bus as said one instruction processor.

4. The method of claim 3 wherein after said hierarchical selection agenda first selects said second level switching queue from among switching queues associated with instruction processors on a same bus as said one instruction processor, if said one instruction processor cannot find a said next task on said second level switching queue, said hierarchical selection agenda then selects a third level switching queue from among switching queues associated with instruction processors that use a shared cache with said one instruction processor.

5. The method of claim 4 wherein after said hierarchical selection agenda selects said third level switching queue from among switching queues associated with instruction processors on a shared cache shared with said one instruction processor, if said one instruction processor cannot find a said next task on said third level switching queue, said hierarchical selection agenda then selects a fourth level switching queue from among switching queues associated with instruction processors that use a crossbar with said one instruction processor.

6. The method of claim 5 wherein after said hierarchical selection agenda selects said fourth level switching queue from among switching queues associated with instruction processors on a shared cache shared with said one instruction processor, if said one instruction processor cannot find a said next task on said fourth level switching queue, said hierarchical selection agenda then selects from among switching queues associated with instruction processors that use another crossbar to access main memory than the one used by said one instruction processor.

7. The method of claim 1 wherein said information about said switching queue is placed as header information into said new task.

8. The method of claim 1 further comprising monitoring busyness of an instruction processor to determine whether to proceed to said inquiring step or to idle said instruction processor and only proceeding to said inquiring step where said monitored busyness reaches a threshold value.

9. The method of claim 8 wherein said monitoring comprises periodically checking the busyness of instruction processors.

10. The method of claim 8 wherein said monitoring comprises periodically checking the busyness of each of said instruction processors.

11. The method of claim 10 further comprising evaluating the relative busyness of said one instruction processor to all others of said instruction processors.

12. The method of claim 8 wherein said threshold value is set differently for different levels of switching queues.

13. The method of claim 1 wherein said selecting of a processor-associated switching queue to which to assign a new task is based upon idleness qualities of all available processor-associated switching queues.

14. The method of claim 1 wherein said selecting of a processor-associated switching queue to which to assign a new task may accomplished using substantially any one of said instruction processors of said multiple instruction processors.

15. The method of claim 14 wherein said selecting of a processor-associated switching queue to which to assign a new task may accomplished using substantially every one of said instruction processors of said multiple instruction processors, as each of said substantially every one of said instruction processors becomes ready to seek a new task.

16. The method of claim 1 wherein said selecting of a processor-associated switching queue to which to assign a new task assigns said task to a switching queue used by a plurality of said instruction processors for their processor-associated switching queue.

17. A method for assigning to and ordered executing of tasks by instruction processors in a multiple instruction processor computer system having hierarchical levels of memory, said method comprising:

selecting a processor-associated switching queue to which to assign a new task, based upon idleness qualities of all available processor associated switching queues, assigning said new task to said selected switching queue by placing information about said selected switching queue into said new task, running a one of said instruction processors based upon tasks having information in said one instruction processor's associated switching queue until there are no tasks in said one instruction processor's associated switching queue and then, determining through the use of a selection matrix which other switching queue may be used as a second level switching queue by said one instruction processor, and inquiring by said one instruction processor of said second level switching queue for a next task that may be available on said second level switching queue.

18. A dispatcher algorithm for use in a multiple instruction processor computer system having at least three levels of memory, said three levels being at least two cache levels, a first of which is accessible directly by a single one of said instruction processors, a mid-level memory being a multi-processor-accessible cache accessible by at least two of said instruction processors, and a third memory level being a main memory, accessible by all of said instruction processors, wherein tasks are directed to switching queues for processor assignment on an affinity basis by an executive and said switching queues are maintained and controlled by said dispatcher algorithm, said dispatcher algorithm comprising:

an executable program for assigning affinity of each new task to a one of said instruction processors executing said executable program, a set of switching queues of substantially the same number as instruction processors wherein one switching queue is associated with said one of said instruction processors and a switching queue is also associated with substantially each other of said instructions processors, said switching queues having code for their operation and a data area wherein said data area is for maintaining a list of tasks for an instruction processor to accomplish, a load balancing level matrix for directing said first instruction processor to steal a task from a switching queue associated with another instruction processor in accord with a predetermined mapping within said matrix when said first instruction processor is looking for an additional task.

19. The apparatus of claim 18 additionally comprising a monitor program for measuring a level of instruction processor busyness/idleness of said one instruction processor, for comparing the level of busyness/idleness to a predetermined threshold, and if the measured level of busyness/idleness exceeds the threshold, for permitting said one instruction processor to use the load balancing level matrix to determine which of said other instruction processor-associated switching queues to seek a new task from.

20. The apparatus of claim 19 wherein said monitor operates as executable code of the dispatcher algorithm used by an instruction processor when said instruction processor seeks a new task wherein a value related to a current level of busyness of said instruction processor using said monitor executable code is stored in an instruction processor busyness data area.

21. The apparatus of claim 20 wherein said monitor evaluates the values stored in said instruction processor busyness data area and generates a level of busyness value of the multiprocessor system there-from, and based on a comparison between said current busyness value for this one instruction processor, produces a transfer affinity value, and wherein said monitor compares said transfer affinity value against a threshold level value to determine whether said another instruction processor will be permitted to steal a task from said one instruction processor-associated switching queue or not.

22. A dispatcher algorithm for use in a multiple instruction processor computer system having at least three levels of memory, said three levels being at least two cache levels, a first of which is accessible directly by a single one of said instruction processors, a mid-level memory being a multi-processor-accessible cache accessible by at least two of said instruction processors, and a third memory level being a main memory, accessible by all of said instruction processors, wherein tasks are directed to switching queues for cluster assignment on an affinity basis by an executive and said switching queues are maintained and controlled by said dispatcher algorithm, said dispatcher algorithm comprising:

an executable program for assigning affinity of each new task to a one of said clusters executing said executable program, wherein a cluster is a group of instruction processors, a set of switching queues of substantially the same number as clusters wherein one switching queue is associated with said one of said clusters and a switching queue is also associated with substantially each other of said clusters, said switching queues having code for their operation and a data area wherein said data area is for maintaining a list of tasks for a cluster to accomplish, a load balancing level matrix for directing said first cluster to steal a task from a switching queue associated with another cluster in accord with a predetermined mapping within said matrix when said first cluster is looking for an additional task.

23. A dispatcher algorithm for use in a multiple instruction processor computer system having hierarchical levels of memory, wherein tasks are directed to switching queues for assignment to a processor unit on an affinity basis by an executive and said switching queues are maintained and controlled by said dispatcher algorithm, said dispatcher algorithm comprising:

an executable program for assigning affinity of each new task to a one of said processor units executing said executable program, a set of switching queues of substantially the same number as processor units wherein one switching queue is associated with one of said processor units and a switching queue is also associated with substantially each other of said processor units, said switching queues having code for their operation and a data area wherein said data area is for maintaining a list of tasks for an processor unit to accomplish, a load balancing level matrix for enabling said first processor unit to steal a task from a switching queue associated with another processor unit in accord with a predetermined mapping within said matrix when said first processor unit is looking for an additional task.

24. A multiple instruction processor computer system having a dispatcher algorithm as set forth in claim 23.

25. A dispatcher algorithm as set forth in claim 23, wherein each said processor unit comprises either a cluster of instruction processors or a single instruction processor.

26. A dispatcher algorithm as set forth in claim 25, wherein at least one of said processor units is comprised of a different number of instruction processors than at least one other one of said processor units.

* * * * *